US007035699B1

(12) United States Patent
Anderson et al.

(10) Patent No.: US 7,035,699 B1
(45) Date of Patent: Apr. 25, 2006

(54) QUALIFIED AND TARGETED LEAD SELECTION AND DELIVERY SYSTEM

(75) Inventors: Gary Floyd Anderson, Danbury, CT (US); Paul Bao-Luo Chou, Montvale, NJ (US); David Edward Chzaszcz, Tolland, CT (US); Pasumarti Venkata Kamesam, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 09/009,083

(22) Filed: Jan. 20, 1998

(51) Int. Cl.
*G06F 17/60* (2006.01)

(52) U.S. Cl. .............................. 700/90; 705/16; 705/35; 709/217

(58) Field of Classification Search ................. 700/90; 705/10, 35

See application file for complete search history.

(56) References Cited

U.S. PATENT DOCUMENTS

| 5,331,544 | A | * | 7/1994 | Lu et al. ....................... 705/10 |
| 5,592,560 | A | * | 1/1997 | Deaton et al. ............... 382/100 |
| 5,687,322 | A | * | 11/1997 | Deaton et al. ................. 705/14 |
| 5,710,884 | A | * | 1/1998 | Dedrick ....................... 709/217 |
| 5,809,242 | A | * | 9/1998 | Shaw et al. .................. 709/217 |
| 5,930,764 | A | * | 7/1999 | Melchione et al. ........... 705/10 |
| 5,966,695 | A | * | 10/1999 | Melchione et al. ........... 705/10 |

FOREIGN PATENT DOCUMENTS

WO            WO 98/49641         * 11/1998

\* cited by examiner

*Primary Examiner*—Firmin Backer
(74) *Attorney, Agent, or Firm*—Stephen C. Kaufman, Esq.; McGinn & Gibb, PLLC

(57) ABSTRACT

The present invention comprises a system dedicated to computerized information management. In particular, the system is efficiently targeted for employment by industries such as insurance and financial services where it is of interest to effect integrated prospect selection and management. To this end, the present invention can prevent multiple agents from pursuing the same lead at the same time, while collecting data on effectiveness of leads from agents to thereby enhance the quality of prospect information, as well as providing a capability so that an individual agent can tailor particular lead selection preferences.

16 Claims, 8 Drawing Sheets

QUALIFIED AND TARGETED LEAD SELECTION AND DELIVERY SYSTEM

FIELD OF THE INVENTION

The present invention relates to computerized information management and processing systems generally.

BACKGROUND OF THE INVENTION

Industries such as insurance and financial services are under constant pressure to reach new customers. Many companies are eager to help their sales agents with business leads, since their business is critically dependent on the revenue generated from new retail customers. In this context, certain data providers are starting to provide name lists via fax or the Internet. However, the leads provided by these data providers are usually of poor quality, and they are not under proper management control.

In the former case, for example, the leads usually do not match well with the population that is likely to purchase a target product. Such leads are typically used in mass mailing campaigns to accommodate the low success rates associated with them. Mass campaigns with low quality leads are especially costly and ineffective for products designed to meet specific niche market needs. AS industries move towards targeted marketing with niche products, it becomes even more important to be able to identify high quality leads for specific products.

In the latter case, moreover, it is likely that a lead is pursued by multiple agents at the same time for the same product. This is undesirable, however, since it typically confuses and irritates a potential customer, resulting in a negative impression about the company by the prospect. It also reduces each agent's success rate with the leads when multiple agents compete for the same lead.

SUMMARY OF THE INVENTION

We have found, therefore, that a need exists for an integrated prospect selection and management system that can provide controlled access to multiple sales agents.

The present invention can provide capabilities for preventing multiple agents from pursuing the same lead at the same time, thereby preventing an agent from consuming an extraordinary number of good leads, thus reducing other agents' opportunities to sell, while collecting data on the effectiveness of the leads from agents to further enhance the quality of the prospect information.

The present invention comprises a system including:
1) a central processing unit (CPU);
2) at least one input user interface module connected to the CPU, at least one of which interface module comprises:
   I) means for inputting lead management data for operation upon by the CPU; and
   II) means for inputting lead selection parameters for operation upon by the CPU;
3) a set of functional modules to be executed by the CPU, wherein:
   I) a first functional module comprises a system security capability;
   II) a second functional module comprises a lead management capability; and
   III) a third functional module comprises a lead selection capability;
4) a CPU means responsive to input user requests comprising at least one of lead management data and lead selection parameters, the CPU means responding to said request by executing at least of one of the first, second, and third functional modules for generating information comprising at least one of:
   I) a set of leads; and
   II) signification of a request; and
5) means connected to the CPU for outputting the information to an output user interface.

BRIEF DESCRIPTION OF THE DRAWINGS

The invention will be more fully understood by reference to the following drawings, in which.

DETAILED DESCRIPTION OF THE INVENTION

The invention in its broadest aspect has been summarized above. We now turn to preferred subsumed elements, features, and structural variations of the present invention. To this end, attention is now directed to FIG. 1, which shows a system 10 of the present invention.

Figure 1:
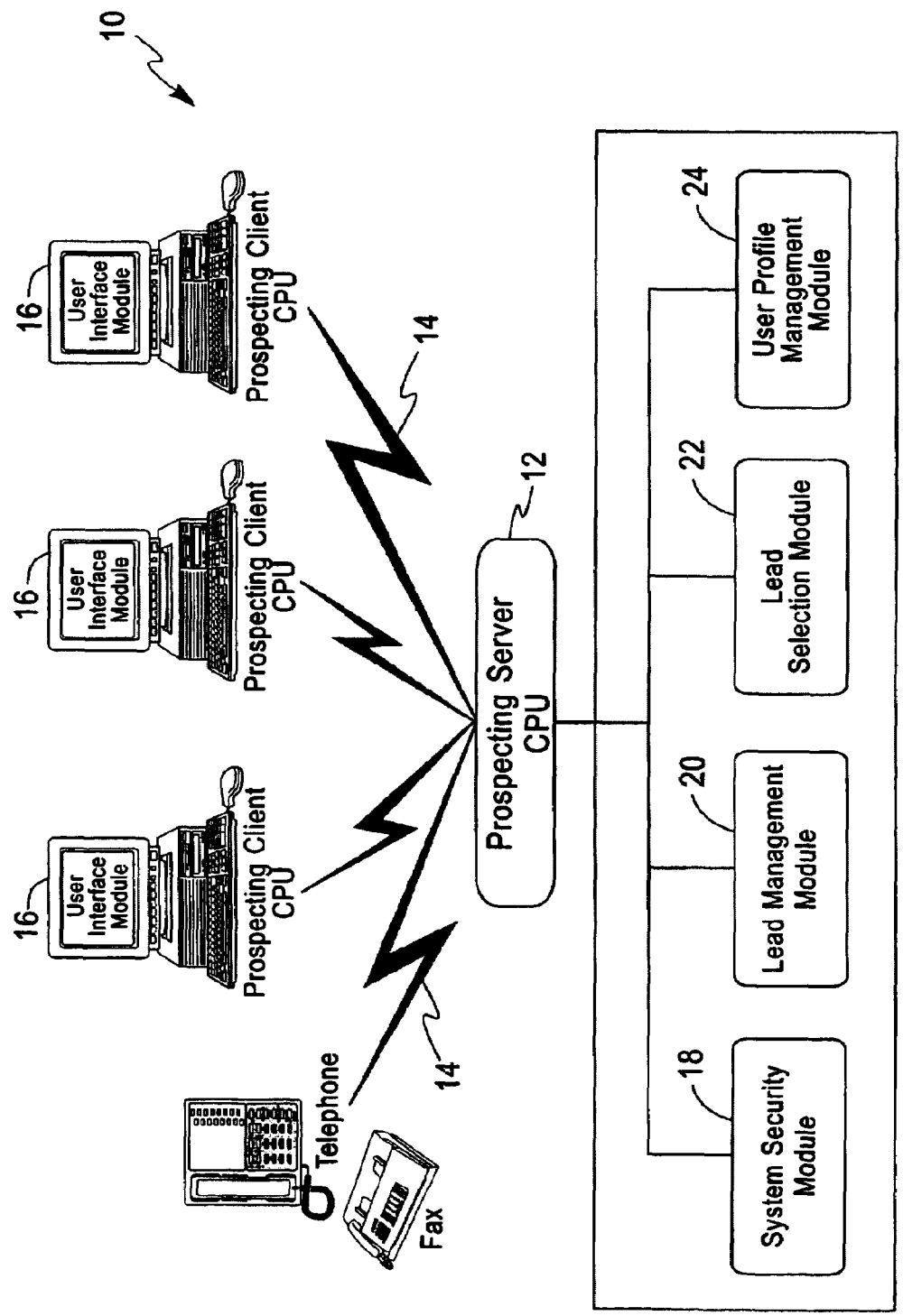
FIG. 1 shows a system architecture of the present invention.

In overview, the FIG. 1 system 10 comprises a conventional central processing unit 12. The CPU 12 can accept inputs by way of a plurality of communication channels 14 from a plurality of user input interface modules 16, as shown. The communication channel 14 may comprise a modem, a telecommunication connection, or network interface devices. The CPU 12 is also preferably connected to output interface modules: for this purpose, the aforementioned user input interface modules 16 may be utilized. Also shown in FIG. 1 are a set of functional modules (numerals 18, 20, 22, 24) to be executed by the CPU 12. With this overview as backdrop, we now provide a detailed description of preferred embodiments.

Figure 2:
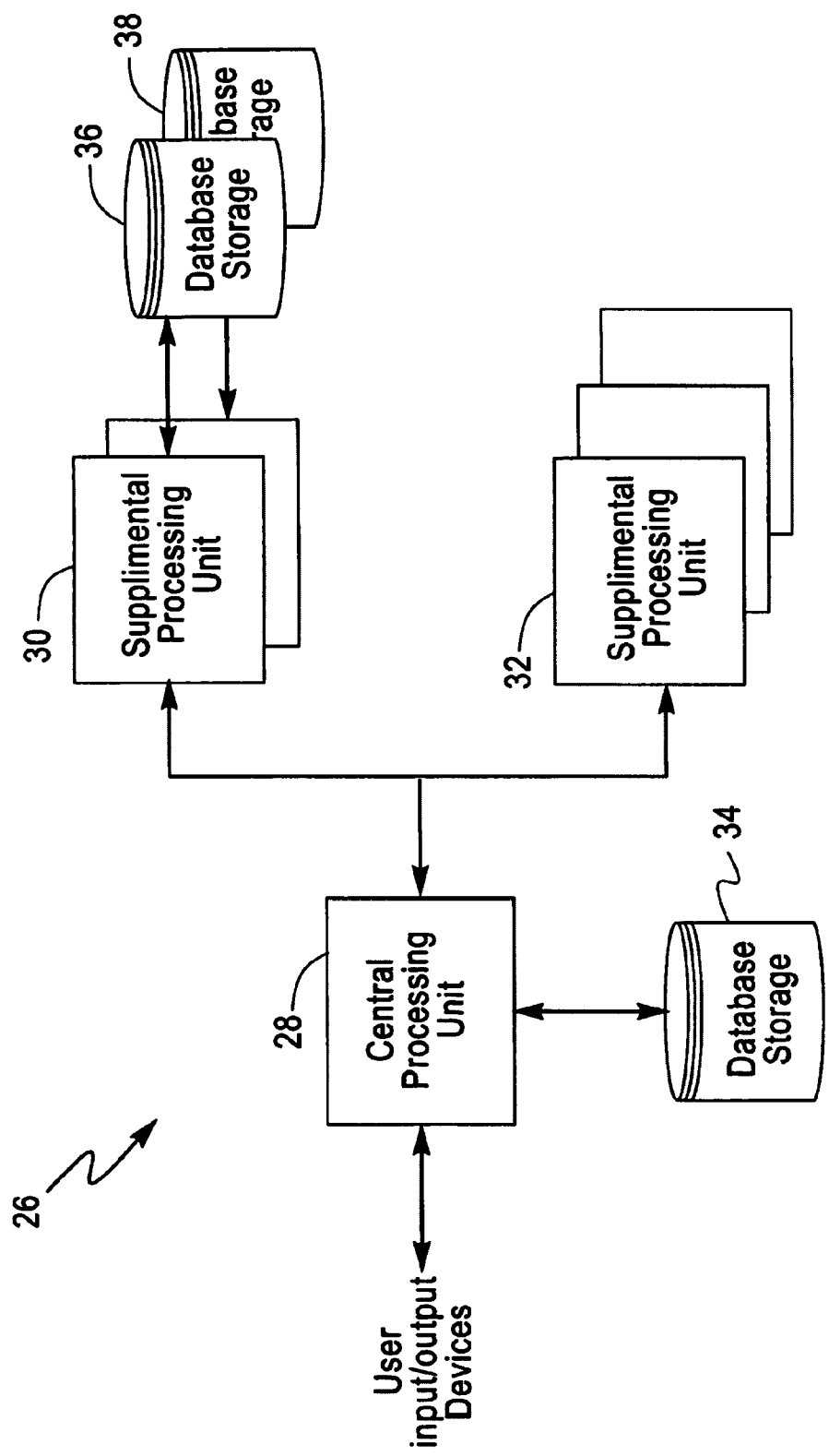
FIGS. 2 and 3 show alternative features of the FIG. 1 architecture.

The functionality provided by the system 10 shown in FIG. 1 may be alternately realized by an architecture of a type shown in FIG. 2. Here, a system 26 incorporates a central process processing unit 28, which can communicate bidirectionally with various processing units (30, 32) and database storage devices (34, 36, 38). In this case, communication from the user input devices is received at the CPU 28 and dispatched to one of the other processing units (30, 32) depending on the nature of the user input and/or the current operating characteristics of the system 26. Each of the processing units (28, 30, 32) may comprise one or more of the functional modules (18, 20, 22, 24) shown in FIG. 1. The CPU 28 may also be connected to user output devices, in which case any results developed by processing units 30 or 32 are communicated to the CPU 28 which in turn communicates these results to the user output devices.

Figure 3:
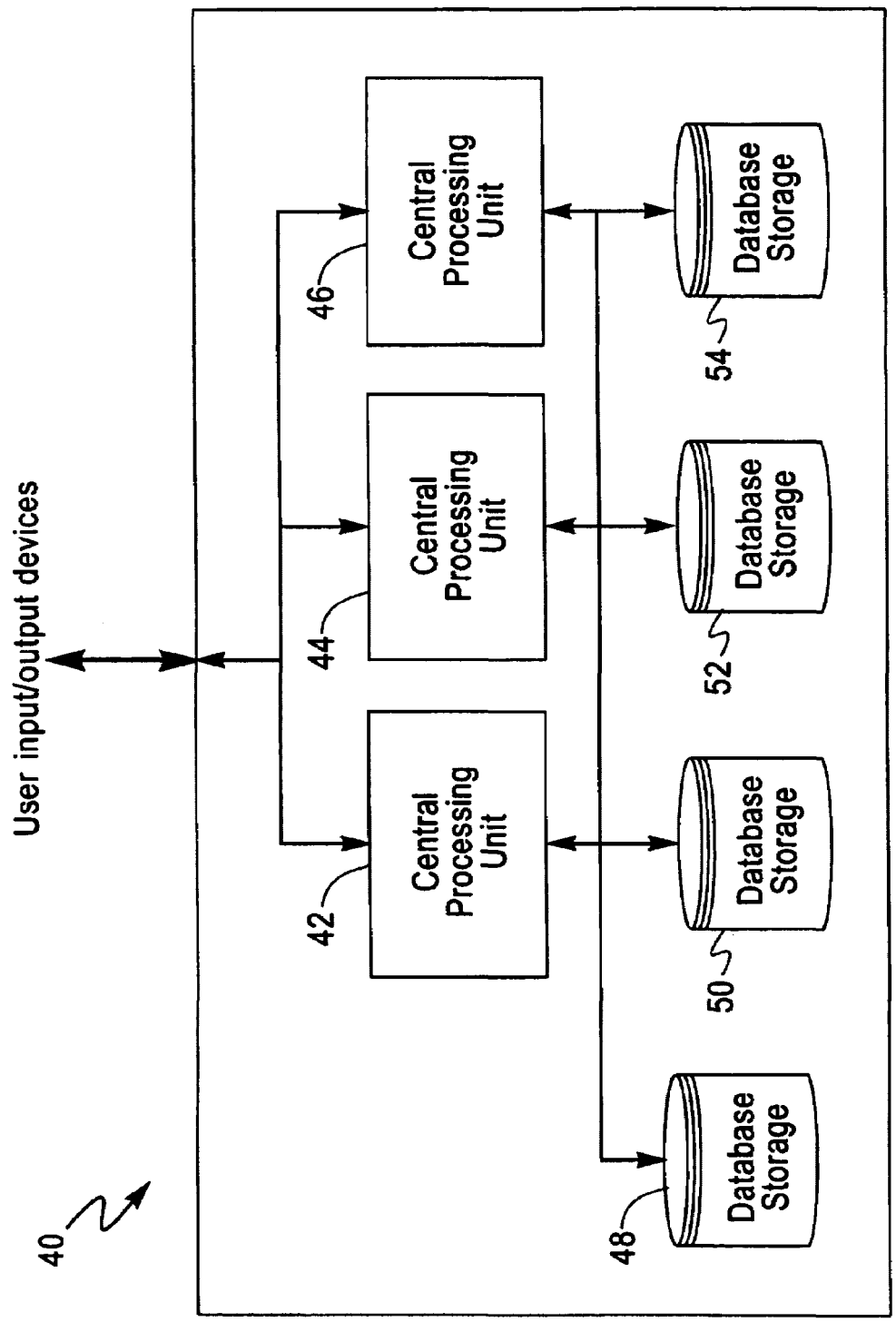

The functionality provided by the system 10 as shown in FIGS. 1 and 2 may further be alternatively realized by an architecture shown in FIG. 3. Here, a system 40 incorporates a group of independent central processing units (42, 44, 46) which are connected to database storage devices (48, 50, 52, 54); and each of which can be connected to user input devices and user output devices. At least one of the central units (42, 44, 46) may also comprise one or more of the functional modules (18, 20, 22, 24) shown in FIG. 1. In this case, communication with the user input devices and the user output devices occurs directly between those devices and the independent CPUs (42, 44, 46).

For the sake of pedagogy, the detailed description now continues by referencing the FIG. 1 system 10.

With reference to the FIG. 1 system 10, we note that an input user interface module 16 comprises means for inputting lead management data for operation upon by the CPU 12; and, comprises means for inputting lead selection parameters for operation upon by the CPU 12. For example, lead management data may be of the type concerning lead usage (further elaboration of this point is provided below with reference to the FIG. 4E, flowchart 56); and, lead selection parameters may be of the type concerning user preferences regarding product and lead selection (see FIG. 4D, flowchart 58, below).

Figure 4B:
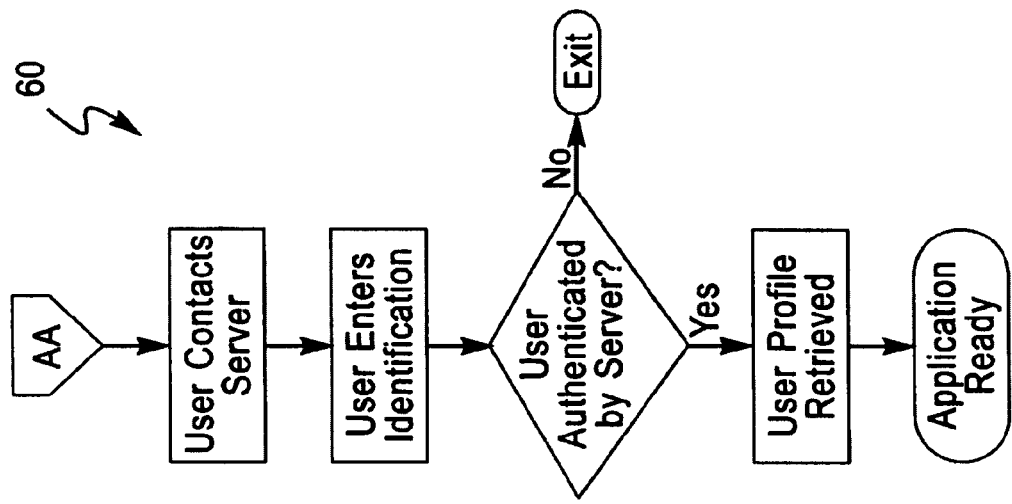
FIGS. 4A–G comprise flowcharts for realization and operation of the FIG. 1 system architecture.

With further reference to the FIG. 1 input user interface module 16, we note that it preferably further comprises means for inputting information comprising user security data for operation upon by the CPU 12. See FIG. 4B, flowchart 60, below.

We now turn our attention to preferred aspects of the FIG. 1 functional modules (18, 20, 22).

The first module 18 comprises a system security capability. This capability allows the system 10 to authenticate a user before granting an access to the system 10, and optionally encrypt/decrypt data communicated between the CPU and user interface modules 16. One way to realize such a capability is to deploy a standard such as Secure Socket Layer (SSL) 3.0.

The second module 20 comprises a lead management capability. The lead management capability provides basic management functions for maintaining prospect data and product information including updating prospect data from external sources. By prospect data, we mean information regarding prospective customers such as age, household size, income, etc. Product information may comprise the names and descriptions of the products for which leads are provided by the system. For each prospective customer, there may also be a score indicating the desirability of the prospect as a lead with respect to a given product. The prospect data and product information may be provided by external sources, refreshed periodically, and may reside in the form of database tables on mass storage accessible by the CPU 12. The lead management capability preferably further provides a lead usage quota mechanism whereby lead quantity, time interval, and availability to a particular user can be controlled. With the quota mechanism, a user is granted at most a predetermined number of leads to pursue at a given time. While a lead is being pursued by a user, the information associated with the lead is concealed from other users requesting new leads for the same product family. The user has a predetermined amount of time to pursue a lead before the lead is considered expired. The user also may close a lead before the lead becomes expired. Once a lead is expired or closed, the user loses the exclusivity of the lead usage. In return, the user's quota is accordingly replenished. We hereafter refer to the leads acquired, but not yet closed or expired, by a user, as the active leads of the user. The lead management capability may further provide lead management functions to enforce business rules such as: two different users cannot contact the same lead for the same product within a 60-day window; if a purchase of a product is made by a lead, it will no longer be available as a lead for that product. Such capability may be realized by maintaining database tables for keeping track of current and past usage of leads.

The third module 22 comprises a lead selection capability. This capability provides functions for retrieving prospect data per user's lead selection preferences and choices. The usage of this module is discussed in detail, below, with reference to FIG. 4D, numeral 58.

In the context of the FIG. 1 functional modules, we note the desirability of adding a fourth functional module 24 comprising a user profile management capability. A user's profile may include information about the user such as name, address, phone numbers, and the user's business operation such as geographic operating locations. It may further include the user's selection preferences indicating the preferred characteristics of leads. Additional information, including the user's lead usage privilege such as the products and number of leads allowed (quota), can also be maintained here.

An important advantage of the architecture of the present invention may be discerned when it is realized that other fifth, sixth, or seventh modules etc. may be readily incorporated as extensions to the FIG. 1 system 10. For example, other modules may generally reference capabilities including lead scoring and/or usage reporting.

As summarized above, the FIG. 1 CPU 12 comprises means responsive to an input user request comprising at least one of lead management data and lead management parameters, the CPU means responding to a request by executing at least of the first, second, and third functional modules. In turn, the CPU generates information comprising at least one of a set of candidate leads and signification of the request. Particulars on this aspect of the invention are illustrated by way of nested FIGS. 4A–4G.

Figure 4A:
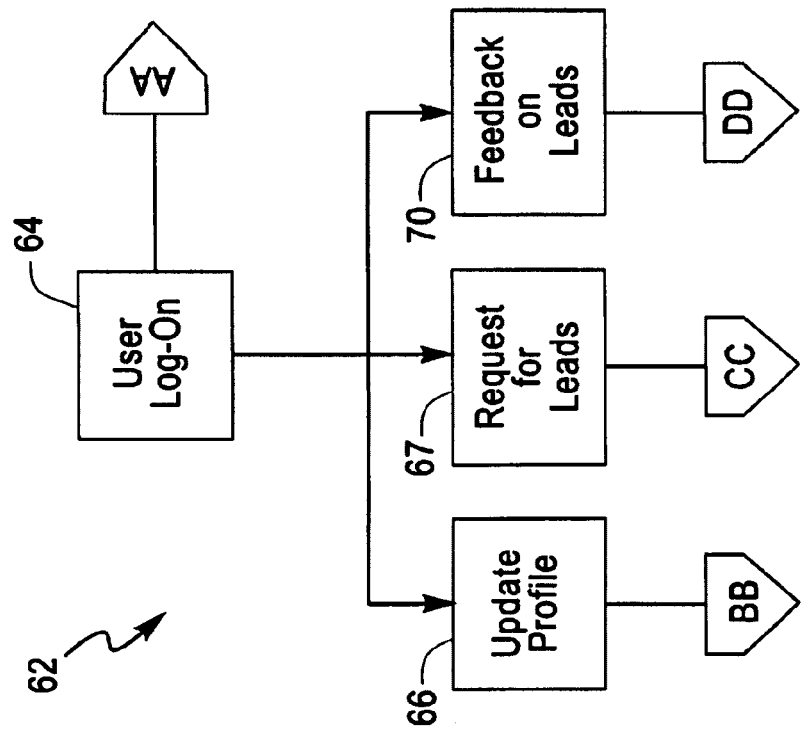
Figure 4C:
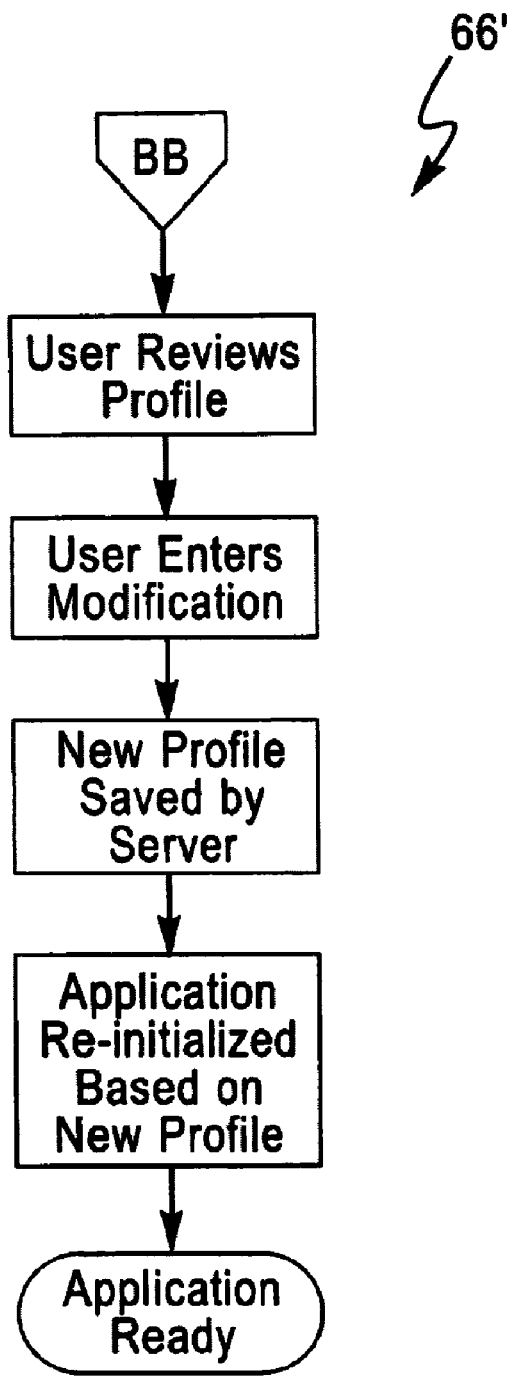

Referring to FIG. 4A (62), the high-level system operations (numerals 64, 66, 68, 70) presented to a user can be seen. At step 64, a user gains an access to the CPU by entering the user's identification data (refer to FIG. 4B flowchart 60). Once access to the CPU is gained, the user can select from a task menu to update his/her profile (step 66), to request for new leads (step 68), or to provide feedback on previously acquired leads (step 70) for lead management purposes. The flowchart in FIG. 4C (numeral 66') is referenced at this point in conjunction with the FIG. 4A step 66 comprising update profile.

Figure 4D:
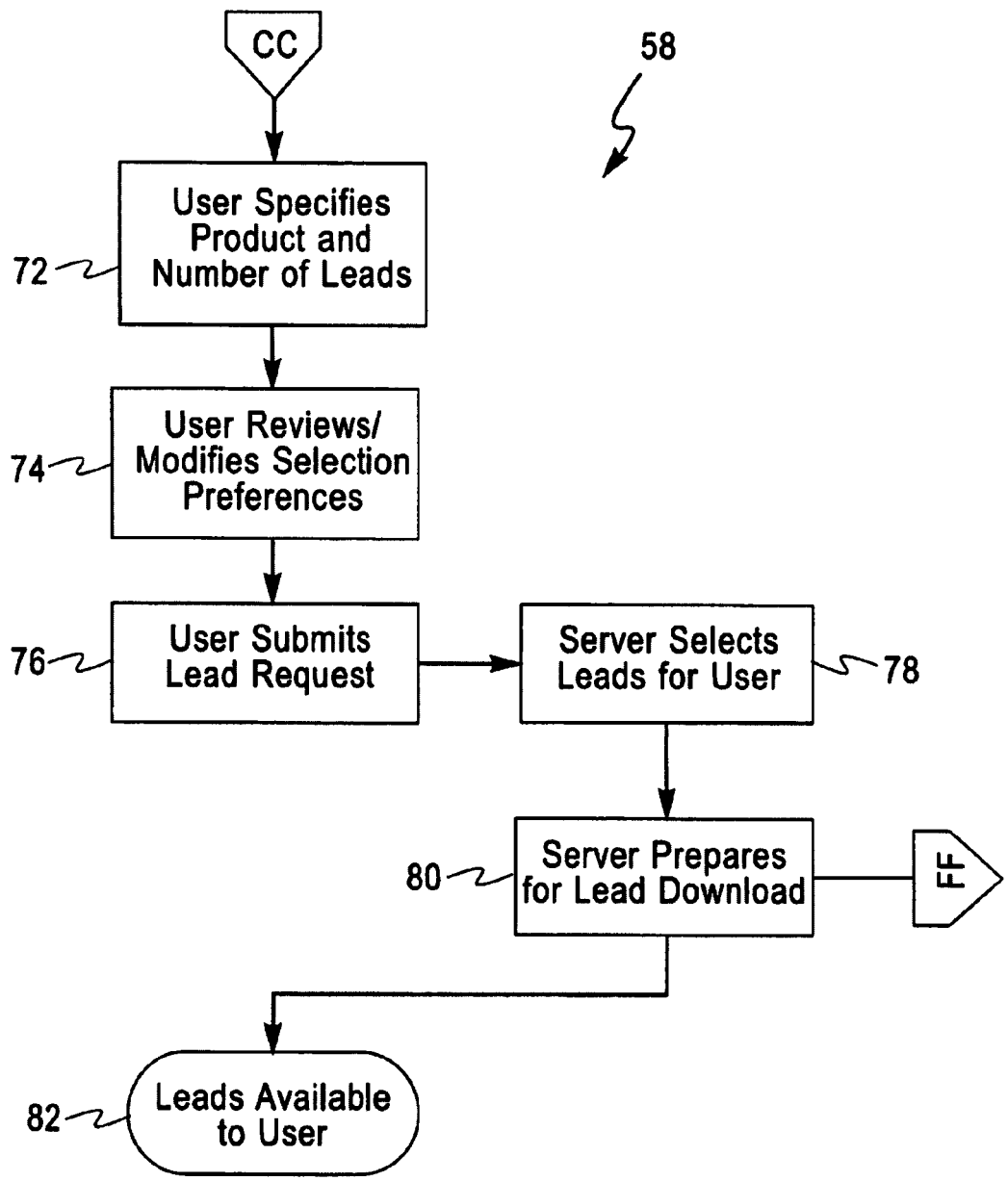

FIG. 4D comprises a flowchart 58 (steps 72–82) that may be used to satisfy the situation comprising request for lead 68 as depicted in FIG. 4A, and comprising user specifying product and number of leads (72) and ultimately outputting leads available to user (82). The number of leads requested cannot exceed the remaining quota for the user. The user can optionally modify, at step 74, his/her selection preferences before submitting the request. Upon receiving the lead request, the CPU 12, with the lead selection module 22, selects the leads with the highest scores from the prospect database that best match the user's selection preferences. For each lead selected, the CPU 12, with the lead management module 20, executes lead locking and logging functions to prevent other users from getting the same lead (refer to FIG. 4F flowchart 84 for more details). Finally, at step 82, the list of selected leads are transmitted to a user input/output interface module 16.

Figure 4E:
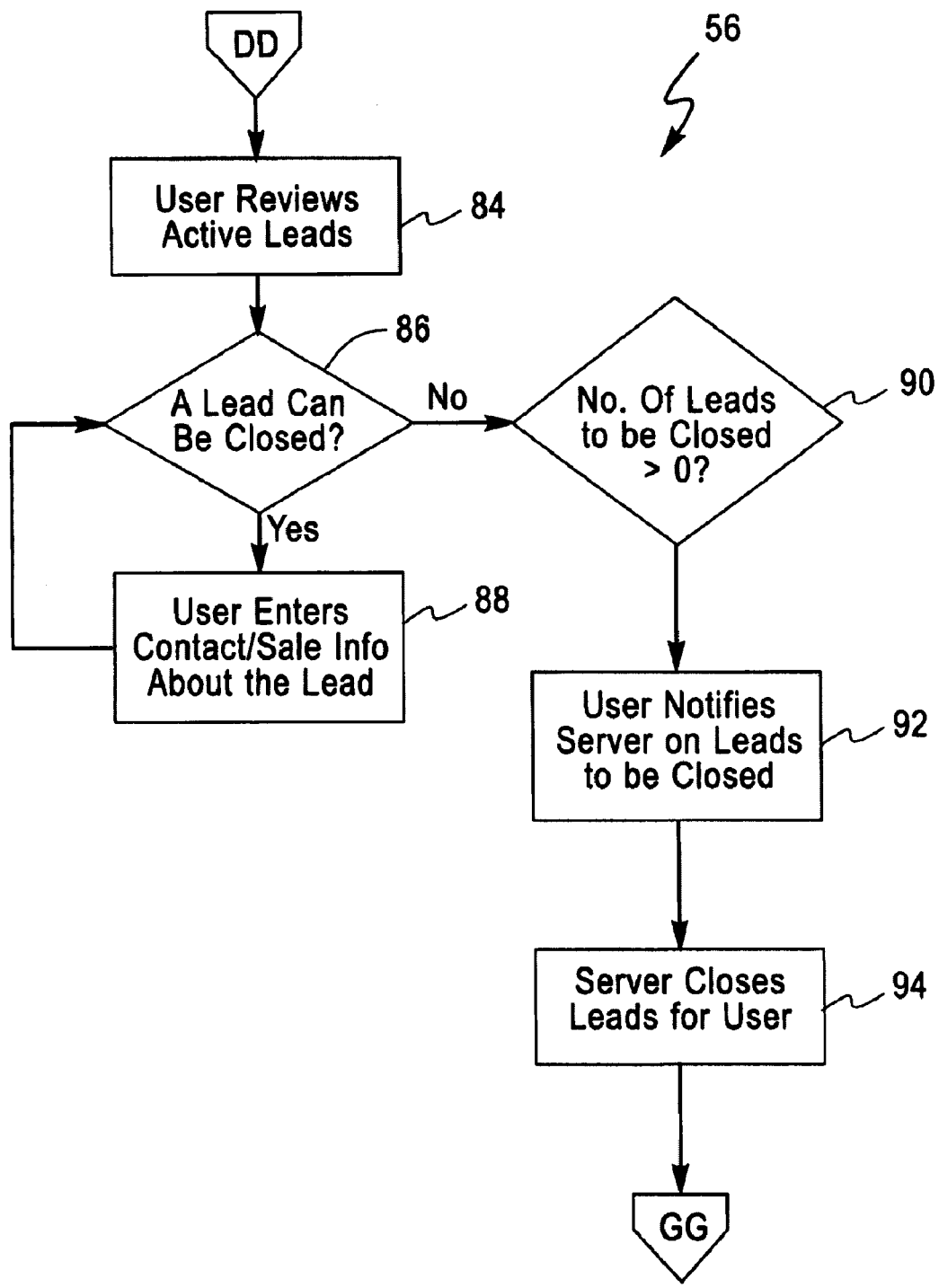
Figure 4G:
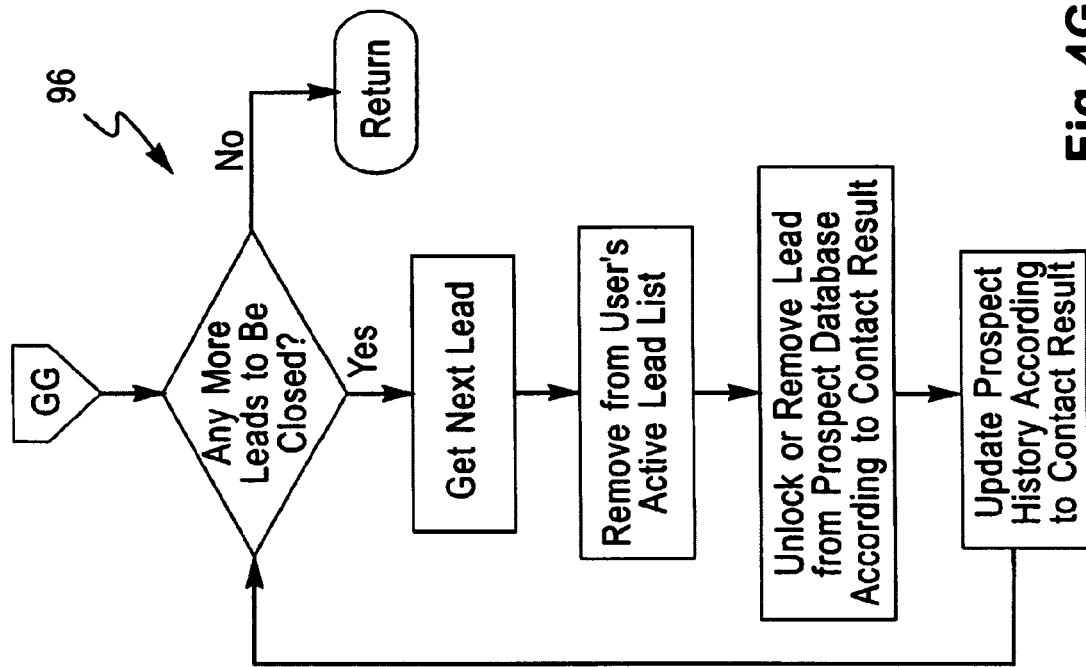
Figure 4F:
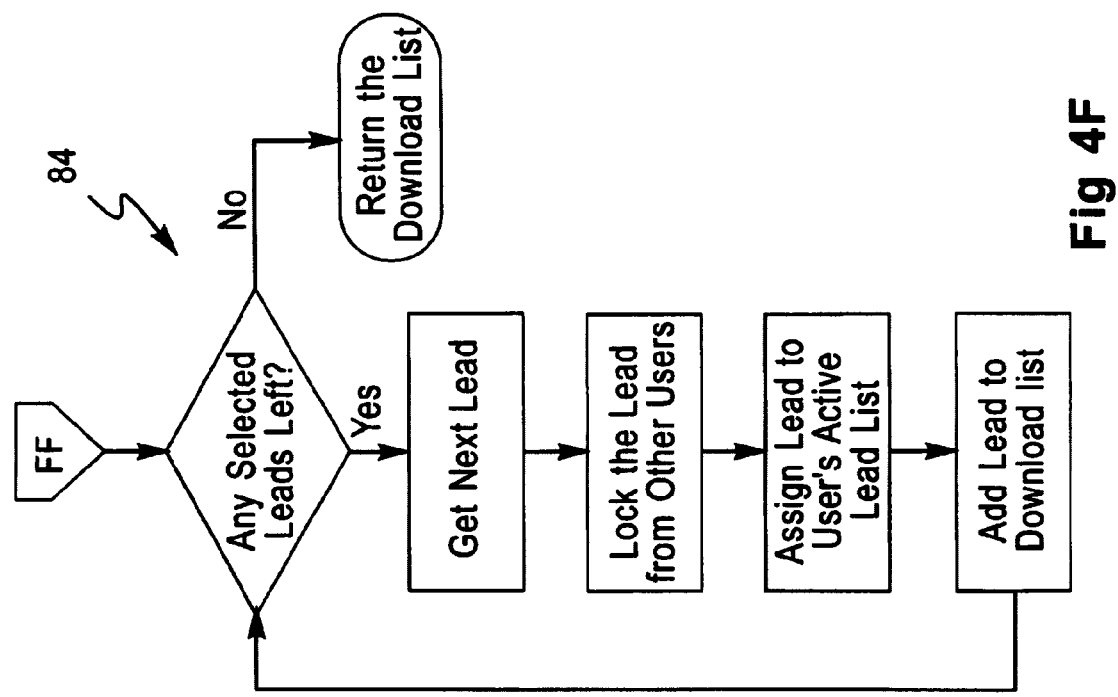

FIG. 4E comprises a flowchart 56 (steps 84–94) that may be used to satisfy the scenario comprising feedback on leads 70 in FIG. 4A. At step 84, a user may review his current active leads. These active leads are compiled by the CPU, and transmitted to and displayed on the user input/output user interface module 16, allowing the user to select ones that are no longer considered as leads by the user and thus can be closed. For each lead to be closed, the user can provide information regarding how the lead was contacted, and if any sale resulted. Refer to FIG. 4G flowchart 96: the operation for closing leads by the CPU 12 can be seen. Depending on the result of the contact reported by the user at FIG. 4E step 88, the CPU 12 may mark the lead available again to other users (e.g., if the lead to be closed was not contacted or no sale was the result) after a resting period, or mark it unavailable for the product (e.g., if a sale of the product was the result). The closed leads are also removed from the user's active lead list (see FIG. 4G), resulting in an increased corresponding number of new leads that the user may request from the system. The quota mechanism described previously encourages users to actively close leads by providing the sale results back to the system. Such feedback information not only may result in more efficient use of the prospect data, but also may be valuable for improving the quality of the leads with respect to a given product.

In all cases, the CPU generates information comprising a set of leads and/or signification of a request. By the term "a set of leads", we mean, by way of example, a list containing name, address and demographic data on a number of individual prospects. A "signification of a request" may be in a form of acknowledgment of the request, and/or a notification indicating the current status or a status change to the user's data, such as profile, active leads, remaining quota, etc. resulting from the request. For example, a signification of a "feedback on leads" request can be a message indicating that your unused lead quota has increased following your submission of feedback on leads with which you are finished.

We note, finally, that the FIG. 1 system 10 comprises means e.g., a modem via the communication channel 14 connected to the CPU 12 for outputting the information to the input/output user interface module 16.

What is claimed:

1. A system comprising:
    a central processing unit (CPU);
    at least one input user interface module connected to the CPU, at least one said module comprising means for inputting lead management data for operation upon by the CPU, and means for inputting lead selection parameters for operation upon by the CPU;
    a set of functional modules to be executed by the CPU, wherein a first functional module comprises a system security capability, a second functional module comprises a lead management capability, and a third functional module comprises a lead selection capability;
    CPU means responsive to an input user request comprising at least one of lead management data and lead selection parameters, the CPU means responding to said request by executing at least of one of the first, second, and third functional modules for generating information comprising at least one of a set of candidate leads and signification of a request; and
    means connected to the CPU for outputting the information to an output user interface.

2. The system according to claim 1, wherein the CPU comprises a microprocessor.

3. The system according to claim 1, wherein the at least one user interface module comprises a remote access terminal.

4. The system according to claim 1, further comprising a fourth functional module comprising a user profile management capability.

5. The system according to claim 4, wherein the CPU means responds to said request by executing at least one of first, second, third, and fourth functional modules.

6. The system according to claim 1, wherein the means connected to the CPU for outputting the information comprises means for outputting to a facsimile.

7. The system according to claim 1, wherein an input customer profile is selectively entered by an individual sales agent, and wherein said lead management capability supplies a best match output of said customer profile.

8. The system according to claim 1, wherein said lead selection capability is for supporting a sales agent and to provide leads on an as-needed basis such that when said agent looks for new customers, said agent inputs through said means for inputting lead selection parameters for requesting leads that best fit what said agent desires.

9. The system according to claim 1, wherein said means for inputting lead selection parameters allow said user to input the user's individual preferences for traits to be associated with the leads said user requires for a type of products to be marketed.

10. The system according to claim 1, wherein said lead selection capability supplies the leads which best match a profile input by a user and based on said user's request.

11. The system according to claim 1, wherein said lead management capability includes a quota mechanism for providing use of the leads by the user, and an exclusivity rule for prevent leads being pursued by multiple users at a same time.

12. The system according to claim 1, wherein a user enters its own criteria to said at least one input user interface module to select leads.

13. The system according to claim 1, further comprising:
    means, based on user input through said at least one input user interface module, for providing feedback to said CPU means, on the leads processed by said user, thereby to refine a scoring mechanism to improve quality of leads received by said user in the future.

14. A lead management system, comprising:
    a central processing unit (CPU);
    means connected to the CPU for inputting lead management data;
    means for inputting lead selection parameters for searching said lead management data,
    wherein said CPU responds to a request for leads tailored to inputted selection parameters by searching said lead management data and outputting selected information to an output user interface; and
    means for enforcing predetermined business rule parameters,
    wherein said business rule parameters comprise a time interval for a selected lead in which no client contact is initiated.

15. A lead management system comprising:
    a central processing unit (CPU);
    means connected to the CPU for inputting lead management data; and
    means for inputting lead selection parameters for searching said lead management data,
    wherein said CPU responds to a request for leads tailored to inputted selection parameters by searching said lead management data and outputting selected information to an output user interface,
    wherein an input customer profile is selectively entered by an individual sales agent, and said lead management capability supplies a best match output of a customer profile.

16. A lead management system comprising:

a central processing unit (CPU);

means connected to the CPU for inputting lead management data; and means for inputting lead selection parameters for searching said lead management data, wherein said CPU responds to a request for leads tailored to inputted selection parameters by searching said lead management data and outputting selected information to an output user interface, and wherein said lead selection capability is for supporting a sales agent and to provide leads on an as-needed basis such that when said agent looks for new customers, said agent inputs through said means for inputting lead selection parameters for requesting leads that best fit what said agent desires.

* * * * *

Disclaimer

Patent No. 7,035,699 - Gary Floyd Anderson, Danbury, CT; Paul Bao-Luo Chou, Montvale, NJ; David Edward Chzaszcz, Tolland, CT; Pasumarti Venkata Kamesam, White Plains, NY. QUALIFIED AND TARGETED LEAD SELECTION AND DELIVERY SYSTEM. Patent dated Apr. 25, 2006. Disclaimer filed Oct. 04, 2006, by the assignee, INTERNATIONAL BUSINESS MACHINES CORPORATION.

Hereby enters this disclaimer to all claims and the entire term of said patent.

*(Official Gazette September 23, 2008)*